United States Patent [19]

Meisenberg

[11] 4,190,478
[45] Feb. 26, 1980

[54] PROCESS AND APPARATUS FOR PRODUCTION OF FACED OR LAMINATED SHEETS

[75] Inventor: Ralf Meisenberg, Düren-Birkesdorf, Fed. Rep. of Germany

[73] Assignee: O. Dorries GmbH, Düren, Fed. Rep. of Germany

[21] Appl. No.: 955,642

[22] Filed: Oct. 27, 1978

[30] Foreign Application Priority Data

Oct. 29, 1977 [DE] Fed. Rep. of Germany ....... 2748675

[51] Int. Cl.² .............................................. B32B 31/00
[52] U.S. Cl. .................................. 156/252; 156/510; 156/522
[58] Field of Search ................ 156/250, 252, 510, 522

[56] References Cited

U.S. PATENT DOCUMENTS

| | | | |
|---|---|---|---|
| 2,209,765 | 7/1940 | Cormack | 156/252 |
| 3,053,723 | 9/1962 | Plach | 156/252 |
| 3,178,329 | 4/1965 | Rohbogner | 156/250 |
| 3,553,049 | 1/1971 | Wolff | 156/250 |
| 4,146,418 | 3/1979 | Walter | 156/252 |

*Primary Examiner*—Douglas J. Drummond
*Attorney, Agent, or Firm*—Ostrolenk, Faber, Gerb & Soffen

[57] ABSTRACT

A process and an apparatus for producing faced or laminated sheets, wherein a carrier web is provided and covering sheets are adhesively attached to the carrier web and the carrier web is then divided into individual faced sections. The carrier web is provided with spaced apart, transversely extending lines of perforations. The carrier web is an endless sheet of corrugated paper and adhesive is applied to the crested side of the corrugated paper. The covering sheets are mounted on the carrier web such that when the carrier web is torn along a line of perforations, at least one of the leading and trailing edges of the respective covering sheet for the torn off section of the carrier web projects beyond the adjacent line of perforations at the end of the torn off section of the carrier web. The covering sheets are either individual sheets or a continuous web which itself is provided with lines of perforations extending transversely across the covering sheet web. Devices feed the carrier web and the covering sheets or covering sheet webs and the devices are so synchronized that the above described projection of the leading or trailing edge of a covering sheet results when a section of faced sheet is torn off. A perforating device may be provided for perforating the carrier web prior to the application of adhesive thereto. An adhesive applying roller applies adhesive to the carrier web immediately before it is faced and after it is perforated. A separating device pulls the sections of faced sheet away from the facing device and this tears each section of faced sheet away from the remainder of the web of faced sheets.

31 Claims, 10 Drawing Figures

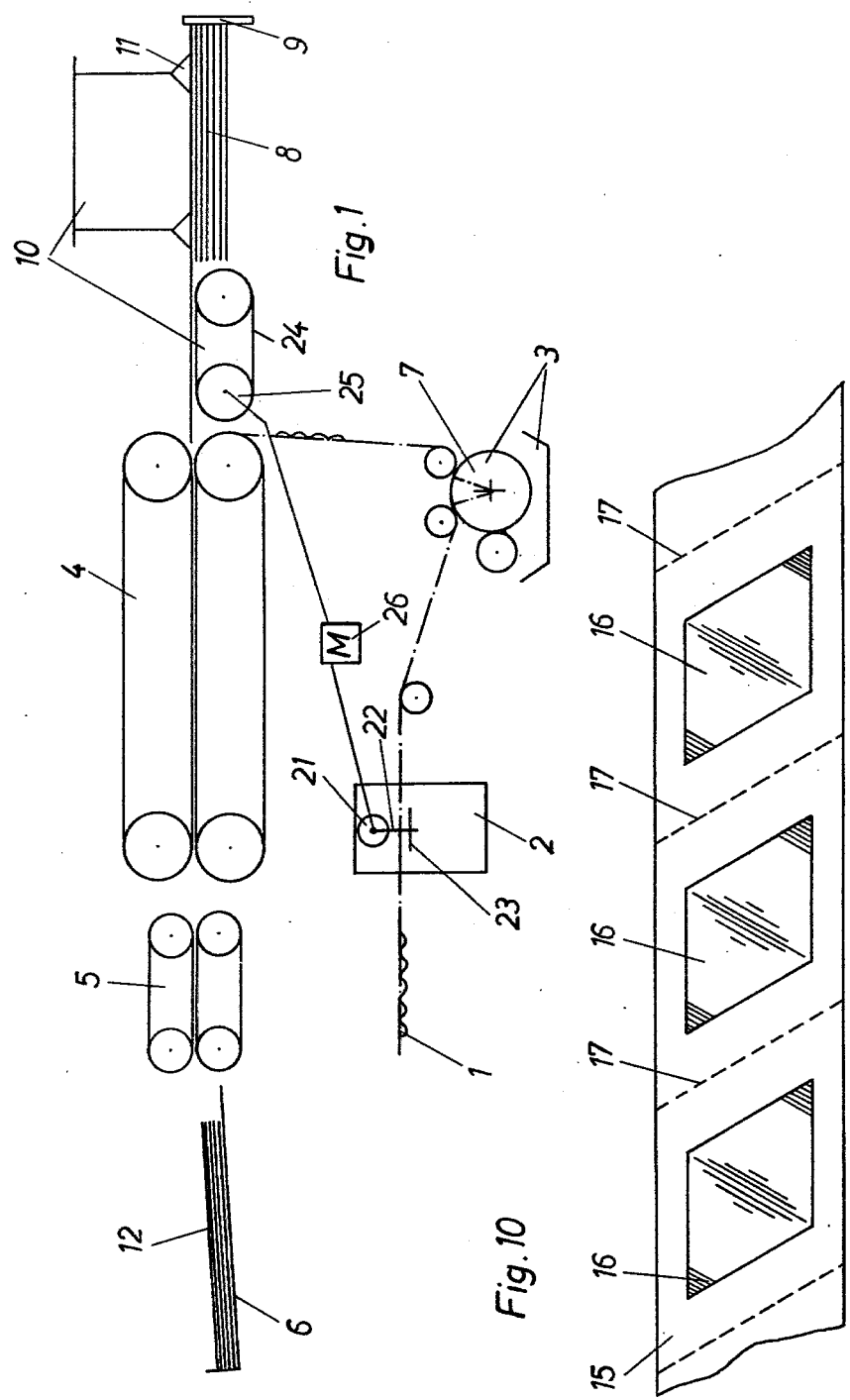

PROCESS AND APPARATUS FOR PRODUCTION OF FACED OR LAMINATED SHEETS

The invention relates to a process for producing faced or laminated sheets, in which covering sheets are mounted on a supporting or carrier web and the faced or laminated web is then divided up into separate faced sheets. The invention also relates to apparatus for producing faced sheets, with a carrier web feed device for supplying a carrier web, a sheet feed device for supplying covering sheets, a facing or laminating device which applies the covering sheets to the carrier web and a separating device for separating the faced sheets from the faced web. The covering sheets are frequently provided with a printed picture or image.

BACKGROUND OF THE INVENTION

With known processes and apparatus of this kind, the web is cut after the facing or laminating process. A register-controlled transverse cutter is required for this purpose, which correlates the cutting line with an image printed on the covering sheets. The printed image is scanned by the register-control device and the blades of the transverse cutter are displaced relative to each other in such a way that the cutting line is always the same distance from a printed registering mark in the printed image. Despite the high technology employed, however, the accuracy of this feed can only be achieved approximately. The high technology employed for scanning a printed registering mark is necessary since an unacceptable cumulative effect of the tolerances would result if, for example, the leading edge of the sheet were used instead as the reference for each processing step. The printing of the sheets, the application and mounting of the facing on the carrier web, the subsequent division of the faced web into separate faced sheets, and the placing of the faced sheets on objects for use as packing material, for instance, are all separate steps of this kind.

In the system on which the invention is based, in general, printed sheets are mounted as a facing on a carrier material in web form. There is also a system in which both the printed sheets and the carrier material are supplied to the facing station in cut sheet form. If, as in the other system, the carrier material is used in sheet form from the outset during the facing process, and particularly when corrugated paper which is covered over on one side is involved, problems arise, especially at high operating speeds, in the supply of the sheets and in the correlation of the carrier sheets and the covering sheets so that covering is effected accurately. In addition, when the adhesive is being applied, the leading edges of the individual carrier sheets have a tendency to stick to the adhesive applying roller. Machines have therefore been developed in which the corrugated paper sheets which are covered over on one side are passed through the adhesive applying device transverse to their direction of manufacture because these sheets then display a greater degree of rigidity in their direction of passage through the apparatus. However, this has the disadvantage that the amount of adhesive applied may be excessive, since the gap between the adhesive applying roller and the supporting roller has to be adjusted to the height of the smallest corrugation. Corrugation of normal height are therefore compressed beyond the normal amount, causing the adhesive to be forced away from the peaks of the corrugations. Apparatus has also been developed in which the carrier material in the form of sheets is passed in front of an adhesive applying roller by means of gripper devices. Gripper devices of this kind are expensive to produce, however, and are susceptible to becoming soiled. Apparatus in which the carrier material is passed along the adhesive applying roller in either a flat orientation or with a curvature that is opposed to the direction of curvature of the adhesive applying roller, also have the disadvantage that the contact time between the adhesive applying roller and the carrier material is only brief. In addition, a supporting roller is required. As already mentioned, the adhesive applying roller and the supporting roller have to be set to a particular gap, with the disadvantages which this entails.

It has also already been proposed to divide up the carrier weg into individual sheets after the adhesive has been applied, but before the facing process. But, since it is necessary for the cutting device to cut into the adhesive while it is still wet, after a short time, adhesive builds up on the blades, hardens there and prevents further trouble free cutting.

SUMMARY OF THE INVENTION

An object of the invention is to make use of the advantages of processing a material in web form in the process and apparatus to reduce the costs, while at the same time achieving a high level of accuracy in the positioning of the covering sheet or its printed image on the faced or laminated sheet after it has been separated from the web and on the object on which the faced sheet is later to be placed.

According to one aspect of the invention, a process for producing faced sheets of the kind discussed above uses a carrier or support web that has lines of perforations that extend transversely to the direction of travel of the web or a carrier web is used which already has such perforations. The covering sheets are mounted on the carrier web in a specific relationship to the lines of perforations. Then the carrier web with a mounted covering sheet is torn off along a line of perforations in such a way that the leading edge and/or the trailing edge of the covering sheet projects beyond the front or rear line of perforations, respectively, on the separated section of the carrier web.

According to another aspect of the invention, apparatus for producing faced sheets includes a carrier web feed device for supplying a carrier web, a sheet feed device for supplying covering sheets, a facing device which applies the covering sheets to the carrier web, and a separating device for separating the faced sheets from the faced web. The separating device is adapted to tear off the faced sheets from the faced web along a line of perforations. The carrier web feed device and the sheet feed device are synchronized with each other in such a way that the covering sheets are mounted on the carrier web, relative to the lines of perforations that are present in the carrier web transversely to its direction of travel, such that, after the tearing off operation, the leading and/or trailing edge of the covering sheet projects beyond the line of perforations in the associated torn section of the web.

The lines of perforations form exactly determined separating lines. Through use of the invention, a registering device for scanning a printed image or imprinted marking is no longer required. This means that one of the sources of inaccuracies in the positioning of the printed image relative to the edges of the sheet is substantially eliminated. The leading edge and/or the trailing edge of the covering sheets which projects beyond the associated section of carrier web can now be used as a reference edge for all ensuing work to be performed, and may be aligned against a stop, for example. Also the positioning of the covering sheet or its printed image is no longer subject to an accumulation of measurement inaccuracies, since the same edge always serves as the reference edge.

Other objects and features of the invention may be readily understood from the following description of one embodiment of apparatus and various forms of faced sheets to be produced therefrom according to the invention, with reference to the accompanying drawings.

BRIEF DESCRIPTION OF THE DRAWINGS

FIG. 1 is a schematic side view of the apparatus of the invention;

FIG. 10 shows a web according to the invention, printed and provided with transverse perforations.

DESCRIPTION OF THE PREFERRED EMBODIMENTS

Figure 1A:
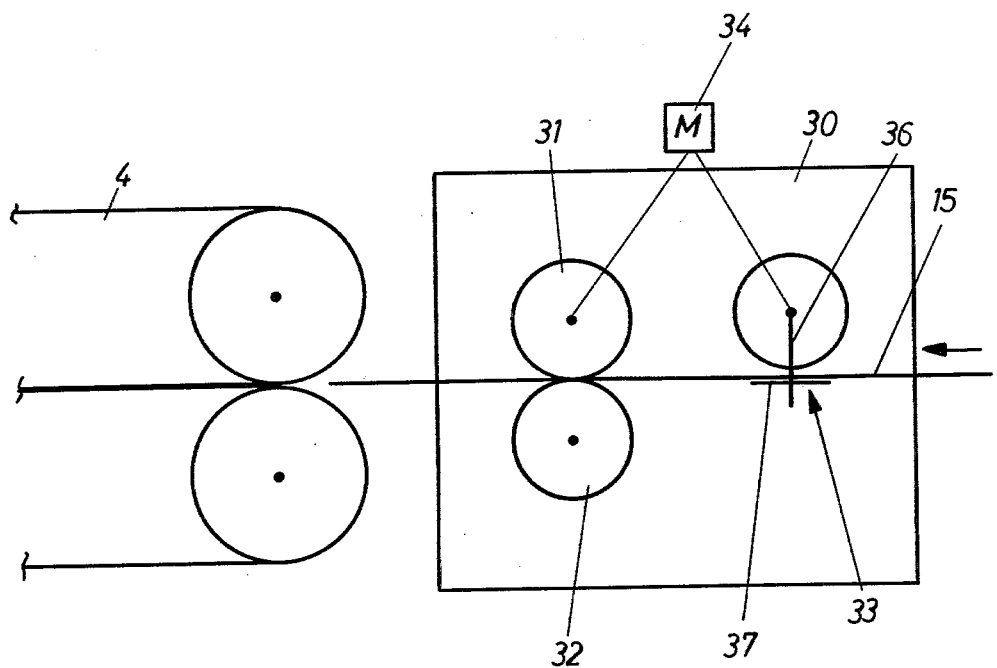
FIG. 1a shows a fragment of the apparatus of FIG. 1 illustrating a second embodiment of a sheet feeding device.

Referring to FIG. 1, a web 1 of corrugated paper which is covered over on one side and is used as a carrier web passes through a perforating device 2, an adhesive applying mechanism 3, a facing device 4 and a separating device 5 and arrives at a stacking station 6.

The perforating device 2 provides the carrier web with lines of perforations extending transversely across the width of the web at specific longitudinal intervals. The perforating device comprises a single revolution shaft 21 with projecting perforating pins 22 arranged in an axially extending row. The web passes over a platen 23 and the pins 22 press the web 1 against the platen and puncture it to define the perforations.

In the adhesive applying mechanism 3, the carrier web 1 is wrapped around part of the upper half of an adhesive applying roller 7. This assures there is a sufficiently long contact time between the applying roller 7 and the corrugation crests of the carrier web 1, at the points on which the adhesive is required for mounting the covering sheet 8. This also saves adhesive, since the adhesive cannot flow into the valleys between the corrugation crests on the carrier web 1.

The adhesive applying section 3 is arranged immediately upstream of the facing device 4. There are no other devices between them. The facing process is therefore effected immediately after the adhesive has been applied, so that the adhesive can penetrate almost simultaneously into the carrier web 1 and the covering sheets 8. In this way, the moist adhesive is distributed evenly over the two materials and an even variation in length due to the moistening effect is obtained in both the carrier web 1 and also in the covering sheets 8. This has a particularly favorable effect on the flatness of the finished faced sheets.

Covering sheets 8 in the form of printed sheets are fed from a supply stack 9 into the facing device 4, by means of a feed device 10. The covering sheets are fed together with the carrier web 1. During this process, the covering sheets 8 come to rest on the corrugation crests of the carrier web 1. The feed device 10 includes suction devices 11, for example suction cups, for lifting each covering sheet in turn, and includes endless conveyor belts 24 for transporting each lifted covering sheet 8 into the facing device 4. The belts 24 are carried on and moved by the rotatable single revolution shafts 25. The facing device 4 presses the covering sheets onto the carrier web 1 and thereby binds them firmly together.

Since the carrier web is still in the form of a complete as yet unseparated web during the facing process, there can be no twisting or curling up of the sections of the web, which sections are predetermined by the lines of perforations, as these sections are still connected together.

The separation device 5 may, for example, include conveyor belts which run more quickly than the conveyor belts of the facing device 4. In this way, the faced or laminated carrier web 1 is torn off along its then forwardmost line of perforations. The faced sheets 12 formed in this way are stacked at the stacking station 6.

Figure 2:
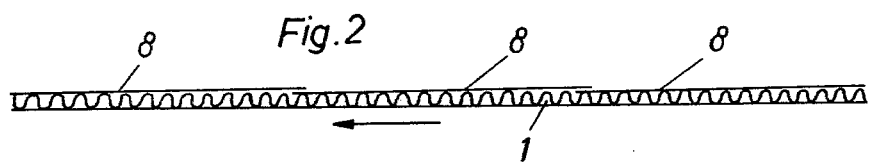
FIGS. 2–5 are cross-sectional views showing one possibility for the production of faced sheets according to the invention.
Figure 3:
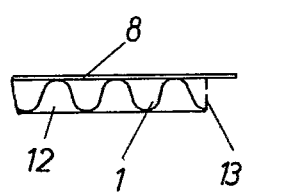
Figure 4:
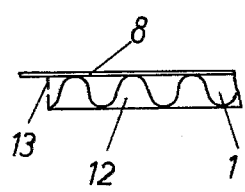
Figure 5:
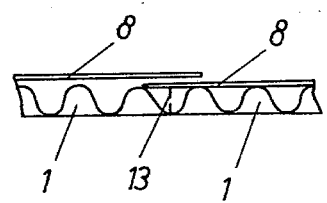
Figure 6:
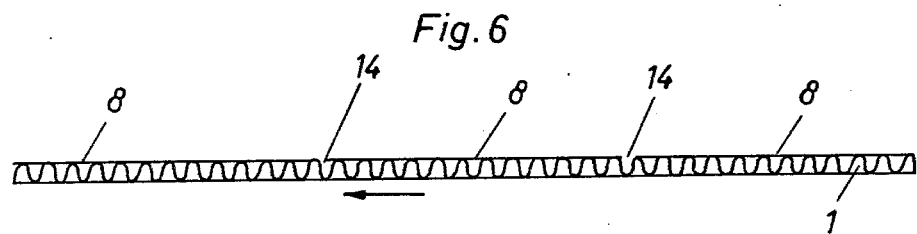
FIGS. 6–9 are cross-sectional views showing another possibility for the production of faced sheets according to the invention.
Figure 7:
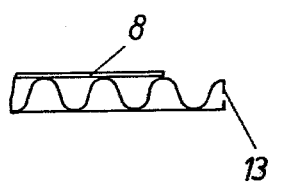
Figure 8:
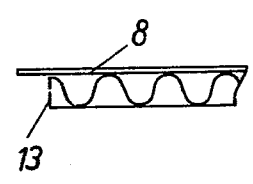
Figure 9:
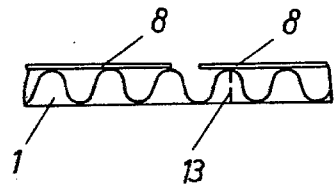

The covering sheets 8 may overlap one another as shown in FIGS. 2 to 5, or they may be mounted on the carrier web 1 with gaps between them as shown in FIGS. 6 to 9. FIG. 2 shows a cross-section through a section of the carrier web 1 with mounted or laminated overlapped covering sheets 8. On a larger scale, FIG. 3 shows the rear end and FIG. 4 shows the front end of a faced sheet which has been torn off along a line of perforations 13. On the same scale, FIG. 5 shows the overlapped ends of the covering sheet 8 on the carrier web 1, with the projecting leading or trailing edges of the covering sheets 8. FIG. 6 is also a cross-sectional view showing covering sheets 8 mounted on the carrier web 1 with gaps 14 between the adjacent sheets 8. On a larger scale, FIG. 7 shows the rear end and FIG. 8 the front end of a torn-off faced sheet 12. FIG. 9 shows an enlarged section of the faced carrier web 1.

The alignment of the lines of perforations on the carrier web 1 with the front or rear edges of the covering sheets 8 can be carried out reliably and easily by linking together the so-called single-revolution shafts 21 and 25 (which carry out one revolution when covering the length of one sheet) of the perforation device 2 and the sheet feed device 10 respectively. Such linking is accomplished by driving both shafts through a common motor drive 26 which is connected by belts with the shafts 21 and 25 or by other connection means. This same drive 26 may also drive both of the facing device 4 and the separation device 5. By varying the gear ratio between the linked single-revolution shafts 21 and 25 and the common drive 26, the format length for the carrier web 1 and also for the covering sheets 8 may be adjusted jointly. The positioning of the lines of perforations on the front or rear edges of the covering sheet 8 can be carried out, for example, by adjusting the angle of rotation at the connection between the two single-revolution shafts, or by some other means.

According to a particular feature of the invention, instead of using separate covering sheets 8, a covering web can be used, which is perforated between the separate covering sheet sections by a perforating device, with perforations extending transverse to the direction of travel of the web, in a similar way to the carrier web 1. A covering web 15 of this kind, with printed pictures 16 and longitudinally separated rows of transverse perforations 17 is shown in FIG. 10. The perforations 17 can be produced in a printing machine (not shown) which prints the pictures 16. The two lines 13 and 17 of perforations in the carrier web 1, on the one hand, and in the covering web 15, on the other hand, are then lined up with each other in the desired way in the facing device 4. Suitable control units for such alignment are of known construction and are therefore not described in detail here. It is possible to operate more rapidly with a connected covering web 15, since it is not necessary to line up individual covering sheets. Moreover, a web can be conveyed more rapidly and more accurately than separate sheets. After the covering web 15 has been mounted on the carrier web 1, both webs are torn off by the separating device 5, along the lines 13 and 17 of perforations which are nearest the front at any given time, and then are delivered to the stacking station 6.

Although the present invention has been described in connection with a plurality of preferred embodiments thereof, many variations and modifications will now become apparent to those skilled in the art. It is preferred, therefore, that the present invention be limited not by the specific disclosure herein, but only by the appended claims.

FIG. 1a shows a web feed device 30 having two feeding rollers 31 and 32 resp. gripping the continuous covering web 15 and feeding it to the facing device 4. A perforating device 33 of the web feed device 30 may work in the same way as the perforating device 2. A common drive 34 drives the roll 31 and a revolution shaft 35 with projecting perforating pins 36 arranged in an axially extending row. The web 15 passes over a platen 37 and the pins 36 press the web 15 against the platen 37 and puncture it to define the perforations 17.

What is claimed is:

1. A process for producing faced sheets, comprising the steps of:
   providing an elongated carrier web having lines of perforations that extend transversely to the direction of travel of the carrier web;
   mounting a plurality of covering sheets in series to the carrier web, with each covering sheet being mounted to the carrier web and with each covering sheet having a leading edge facing in the direction of travel of the carrier web and having a trailing edge facing in the opposite direction;
   then tearing off a section of the carrier web along a line of perforations and with the respective covering sheet being on the torn off section of the carrier web; the covering sheets being so placed that at least one of the leading and trailing edges of each covering sheet projects beyond the adjacent line of perforations on the separated section of the carrier web.

2. The process for producing faced sheets of claim 1, wherein the amount by which a covering sheet projects beyond the respective line of perforations on its respective section of the carrier web is adapted to be set selectively.

3. The process for producing faced sheets of either of claims 1 or 2, wherein the carrier web is comprised of a corrugated paper material and the covering sheets are mounted to the crested side of the carrier web.

4. The process for producing faced sheets of claim 1, wherein the step of providing the carrier web comprises first perforating a length of the carrier web to define the lines of perforations therein.

5. The process for producing faced sheets of either of claims 1 or 4, wherein said mounting step comprises attaching the carrier web and the covering sheets by an adhesive.

6. The process for producing faced sheets of claim 5, wherein the covering sheets are mounted to the carrier web immediately after the adhesive has been applied thereto.

7. The process for producing faced sheets of claim 5, wherein the carrier web is comprised of a corrugated paper material and the covering sheets are mounted to the crested side of the carrier web.

8. The process for producing faced sheets of claim 5, wherein the mounting by applying an adhesive is accomplished by passing the carrier web partially over an adhesive applying roller.

9. The process for producing faced sheets of claim 5, wherein the adhesive is applied to the carrier web after that web has been perforated.

10. The process for producing faced sheets of claim 9, wherein the mounting by applying an adhesive is accomplished by passing the carrier web partially over an adhesive applying roller.

11. The process for producing faced sheets of claim 10, wherein the adhesive is applied to what is then the downwardly facing side of the carrier web.

12. The process for producing faced sheets of claim 10, wherein the covering sheets are mounted to the carrier web immediately after the adhesive has been applied thereto.

13. The process for producing faced sheets of claim 10, wherein the carrier web is comprised of a corrugated paper material and the covering sheets are mounted to the crested side of the carrier web.

14. The process for producing faced sheets of claim 1, wherein the covering sheets are so placed on the carrier web and are of such a length that both of the leading and trailing edges of each covering sheet extend beyond the adjacent line of perforations in the carrier web and the edge of one carrier sheet overlaps the adjacent edge of the adjacent carrier sheet.

15. The process for producing faced sheets of either of claims 1 or 14, wherein the covering sheets are aligned in a row in the form of a continuous web, which covering sheet continuous web is also perforated along lines extending transversely to the direction of travel of the carrier web, and the individual covering sheets are defined between adjacent lines of perforations in the covering sheet web;
   upon the tearing of a section of the carrier web, at a respective line of perforations thereon, the adjacent line of perforations on the covering sheet web is also torn, thereby defining the separated faced sheet.

16. The process for producing faced sheets of claim 15, wherein the carrier web is comprised of a corrugated paper material and the covering sheets are mounted to the crested side of the carrier web.

17. The process for producing faced sheets of claim 15, wherein said mounting step comprises attaching the carrier web and the covering sheets by applying an adhesive to the carrier web after that web has been perforated.

18. The process for producing faced sheets of claim 17, wherein the covering sheets are attached to the carrier web immediately after the adhesive has been applied thereto.

19. The process for producing faced sheets of claim 18, wherein the carrier web is comprised of a corrugated paper material and the covering sheets are mounted to the crested side of the carrier web.

20. Apparatus for producing faced sheets, comprising:

a carrier web feed device for feeding a carrier web;

a sheet feed device for supplying covering sheets;

a facing device placed for receiving the fed carrier web and the supplied covering sheets and for applying the covering sheets to the carrier web;

for the faced sheets, each of which comprise a section of carrier web carrying a covering sheet, a separating device for separating each faced sheet in turn from the faced carrier web along a line of perforations extending transversely across the carrier web and joining each faced sheet to the faced sheet carrier web;

synchronizing means for synchronizing motion of said carrier web feed device and said sheet feed device such that after said separating device has operated, each covering sheet, which has a leading and a trailing edge with respect to the direction of travel of the carrier web which travel is caused by said carrier web feed device, has at least one of its leading and trailing edges projecting beyond the adjacent line of perforations in the associated torn off section of the carrier web.

21. The apparatus for producing faced sheets of claim 20, wherein the carrier web feed device further comprises a perforating device for perforating the carrier web transversely across its direction of travel and at spaced intervals along the length of the carrier web.

22. The apparatus for producing faced sheets of claim 21, wherein said synchronizing means is connected with said perforating device of said carrier web feed device.

23. The apparatus for producing faced sheets of either of claims 20 or 21, wherein said sheet feed device is adjustable relative to said carrier web feed device and relative to the lines of perforations in the carrier web.

24. The apparatus for producing faced sheets of either of claims 20 or 21, wherein said facing device comprises an adhesive applying section for applying adhesive to the carrier web and said adhesive applying section being arranged downstream of said carrier web feed device in the direction of travel of the carrier web which is caused by said carrier web feed device.

25. The apparatus for producing faced sheets of claim 24, wherein said adhesive applying section is arranged immediately upstream of said facing device along the path of travel of the carrier web.

26. The apparatus for producing faced sheets of claim 24, wherein said adhesive applying section comprises an adhesive applying roller and means for looping the carrier web around a portion of said adhesive applying roller, thereby for applying adhesive to a surface of said carrier web.

27. The apparatus for producing faced sheets of claim 26, wherein said adhesive applying roller is arranged immediately upstream of said facing device along the path of travel of the carrier web.

28. The apparatus for producing faced sheets of either of claims 20 or 21, wherein said sheet feed device comprises a web feed device for supplying the covering sheets in the form of a continuous web, while said separating device separates each faced sheet from the faced carrier web, said separating device is also separating a section of the covering sheet web and that section of the covering sheet web corresponds to the covering sheet for that faced sheet, and the separation of the section of the covering sheet web is along a line of perforations extending transversely across the carrier web and the covering sheet web.

29. The apparatus for producing faced sheets of claim 28, wherein said sheet feed device further comprises a perforating mechanism for perforating the covering sheet web in lines transversely across the covering sheet web for defining individual covering sheets.

30. The apparatus for producing faced sheets of claim 28, wherein said facing device comprises an adhesive applying section for applying adhesive to the carrier web and said adhesive applying section being arranged downstream of said carrier web feed device in the direction of travel of the carrier web which is caused by said carrier web feed device.

31. The apparatus for producing faced sheets of claim 30, wherein said adhesive applying section is arranged immediately upstream of said facing device along the path of travel of the carrier web.

* * * * *